(12) United States Patent
Huenermann

(10) Patent No.: US 8,316,671 B2
(45) Date of Patent: Nov. 27, 2012

(54) METHOD FOR PRODUCING A HOLLOW CYLINDER OF SYNTHETIC QUARTZ GLASS, AND THICKWALLED HOLLOW CYLINDER OBTAINED ACCORDING TO THE METHOD

(75) Inventor: Michael Huenermann, Alzenau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 559 days.

(21) Appl. No.: 12/448,294

(22) PCT Filed: Dec. 13, 2007

(86) PCT No.: PCT/EP2007/063867
§ 371 (c)(1),
(2), (4) Date: Jun. 29, 2009

(87) PCT Pub. No.: WO2008/071759
PCT Pub. Date: Jun. 19, 2008

(65) Prior Publication Data
US 2010/0081554 A1     Apr. 1, 2010

(30) Foreign Application Priority Data
Dec. 15, 2006   (DE) .................. 10 2006 059 779

(51) Int. Cl.
*C03B 37/018* (2006.01)
*C03B 37/00* (2006.01)
*C03B 25/00* (2006.01)
*C03C 3/06* (2006.01)
(52) U.S. Cl. ............... 65/416; 65/414; 65/427; 65/434; 501/54

(58) Field of Classification Search ............... 65/414, 65/415, 416, 421, 427, 434; 501/54
See application file for complete search history.

(56) References Cited

U.S. PATENT DOCUMENTS 4,217,027 A * 8/1980 MacChesney et al. ....... 385/123
5,665,132 A   9/1997 Ruppert et al.
(Continued)

FOREIGN PATENT DOCUMENTS
DE         197 36 949 C1     1/1999
(Continued)

OTHER PUBLICATIONS
Espacenet English language abstract for JP7267661 A published Oct. 17, 1995.
(Continued)

*Primary Examiner* — Noah Wiese
(74) *Attorney, Agent, or Firm* — Tiajoloff and Kelly LLP

(57) ABSTRACT

A known method for producing a hollow cylinder of synthetic quartz glass comprises the steps of: (a) providing an inner tube of synthetic quartz glass having an inner bore defined by an inner wall, (b) cladding the inner tube (3') with an $SiO_2$ soot layer (4'), and (c) sintering the $SiO_2$ soot layer with formation of the hollow cylinder. Starting therefrom, to indicate a method in which on the one hand the sintering process is completed before the hollow cylinder is further processed together with the core rod, and in which on the other hand a complicated machining of the inner bore of the hollow cylinder of quartz glass is not required, the invention suggests that during sintering the surface temperature of the inner wall of the inner tube should be kept below the softening temperature.

20 Claims, 1 Drawing Sheet

U.S. PATENT DOCUMENTS

| | | | |
|---|---|---|---|
| 5,738,702 A | 4/1998 | Ruppert et al. | |
| 6,253,580 B1* | 7/2001 | Gouskov et al. | 65/391 |
| 6,422,042 B1 | 7/2002 | Berkey | |
| 6,516,636 B1* | 2/2003 | Gansicke et al. | 65/379 |
| 2002/0157425 A1* | 10/2002 | Werner et al. | 65/421 |
| 2003/0140659 A1 | 7/2003 | Fabian | |
| 2005/0232571 A1* | 10/2005 | Fabian | 385/144 |
| 2006/0144094 A1 | 7/2006 | Roselieb et al. | |

FOREIGN PATENT DOCUMENTS

| | | |
|---|---|---|
| DE | 100 25 176 A1 | 12/2001 |
| DE | 101 55 134 C | 12/2002 |
| DE | 103 03 290 A1 | 5/2004 |
| EP | 701 975 A1 | 3/1996 |
| JP | 62 078124 A | 4/1987 |
| JP | S62-078142 A * | 4/1987 |
| JP | 07 267661 A | 10/1995 |
| WO | WO 01/32572 A | 5/2001 |

OTHER PUBLICATIONS

Espacenet English language abstract for JP62078124 A published Apr. 10, 1987.

Espacenet English language abstract for DE10025176 A1 published Dec. 6, 2001.

Espacenet English language abstract for DE19736949 C1 published Jan. 21, 1999.

Espacenet English language abstract for DE10155134 C1 published Dec. 19, 2002.

* cited by examiner

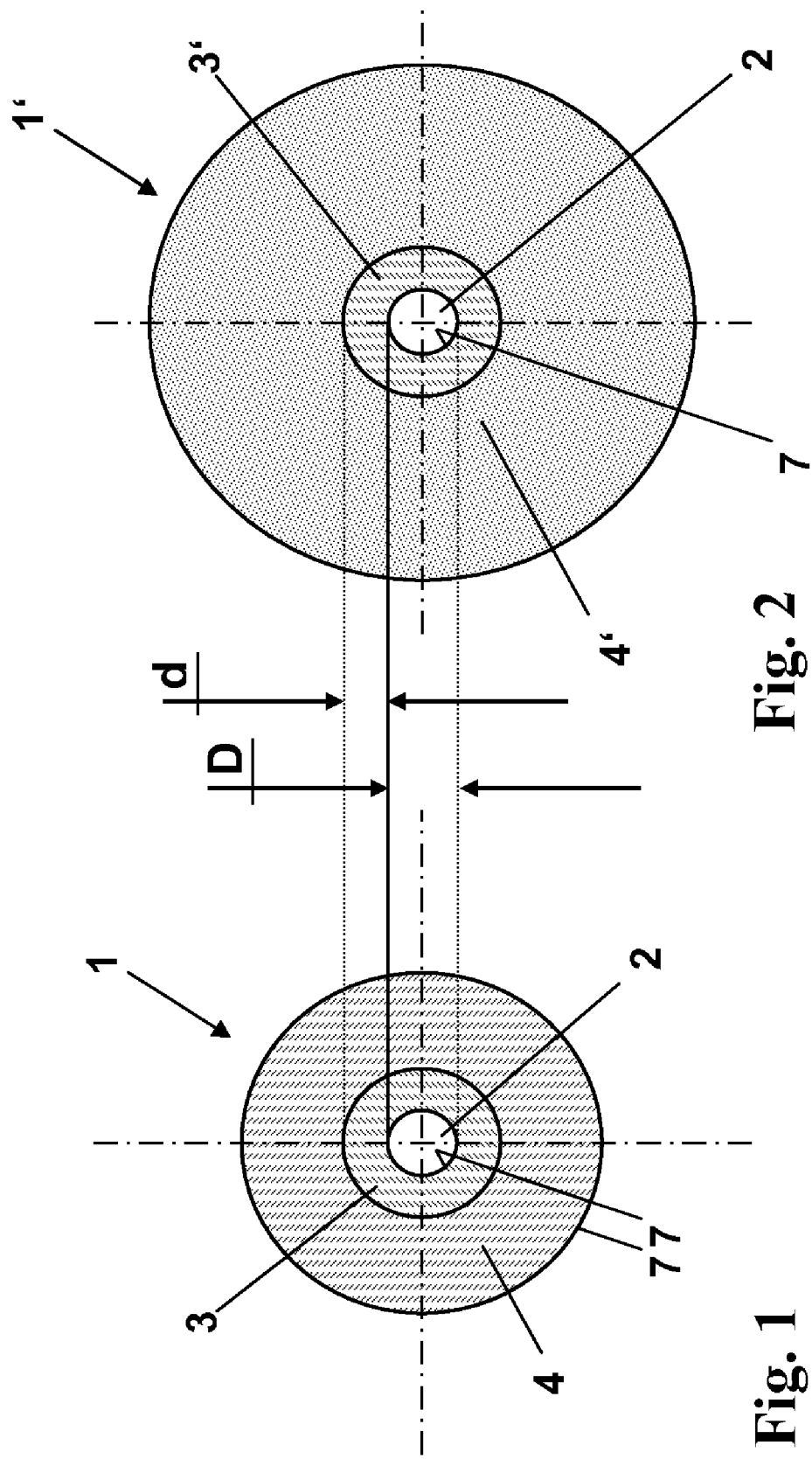

METHOD FOR PRODUCING A HOLLOW CYLINDER OF SYNTHETIC QUARTZ GLASS, AND THICKWALLED HOLLOW CYLINDER OBTAINED ACCORDING TO THE METHOD

The present invention relates to a method for producing a hollow cylinder of synthetic quartz glass, the method comprising the steps of:
a) providing an inner tube of synthetic quartz glass having an inner bore defined by an inner wall,
b) cladding the inner tube with an $SiO_2$ soot layer,
c) sintering the $SiO_2$ soot layer with formation of the hollow cylinder.

Moreover, the present invention deals with a thick-walled hollow cylinder of synthetic quartz glass for use as a semi-finished product in the production of optical fibers and of preforms for optical fibers.

Furthermore, the present invention also relates to methods for producing an optical component, wherein a hollow cylinder of synthetic quartz glass is produced in that an inner tube of synthetic quartz glass is provided having an inner bore defined by an inner wall, the inner tube is clad with an $SiO_2$ soot layer, and the $SiO_2$ soot layer is sintered with formation of the hollow cylinder, a core rod is fixed in the inner bore of the hollow cylinder with formation of a coaxial arrangement, and the arrangement is elongated into the optical component.

Moreover, the invention also relates to a preform obtained according to the method, the preform comprising a core glass region and a cladding glass region surrounding the core glass region.

Hollow cylinders of synthetic quartz glass are used as intermediate products for a great number of components for the optical and chemical industry and particularly for making preforms for optical fibers.

PRIOR ART

The major part of the cladding glass of optical fibers is often provided in the form of hollow cylinders by means of which core rods are overclad. The core rods which normally comprise a core glass region that is already surrounded by a first cladding glass layer are a major cost factor in fiber production. Overcladding of the core rod can be carried out by collapsing and elongating a coaxial arrangement of core rod and hollow cylinder in which the core rod is inserted into the inner bore of the hollow cylinder. Preforms are thereby made, from which optical fibers are then drawn. It is also known that the hollow cylinder is collapsed onto the core rod directly during fiber drawing.

The manufacture of hollow cylinders of quartz glass typically comprises a synthesis of $SiO_2$ particles, a deposition process for forming a porous layer from the $SiO_2$ particles (here also called "soot layer", "soot body", or "soot tube"), and a dehydration and sintering process for vitrifying the soot layer.

DE 197 36 949 C1 describes a typical method for making a tubular soot body according to the "OVD method" (outside vapor deposition). In this method fine $SiO_2$ particles are formed by means of a flame hydrolysis burner by flame hydrolysis of $SiCl_4$ and are deposited layer by layer onto the outer surface of a carrier rod rotating about its longitudinal axis. The result of the deposition process is a soot tube which after removal of the carrier rod is dehydrated and sintered into a quartz glass body.

Sintering (also called "vitrification") of a soot tube is e.g. described in EP 701 975 A1. The soot tube is here introduced into a vitrification furnace and held therein in vertical orientation by means of a vitrification linkage. This linkage comprises a holding rod of carbon fiber-reinforced graphite which extends from above through the inner bore of the soot tube to a holding base and which is surrounded by a gas-permeable cladding tube of graphite. During vitrification the soot tube collapses onto the cladding tube of graphite so that a hollow cylinder of quartz glass can be obtained with a dimensionally accurate inner bore, corresponding to the outer diameter of the cladding tube.

However, due to contact with the vitrification linkage, the hollow cylinder produced in this way has a rough inner surface with baked-in graphite particles, which requires complicated mechanical reworking and subsequent cleaning steps. The method is therefore time-consuming and entails loss of material.

In a modification of this method according to DE 103 03 290 A1, a quartz glass tube is used as a carrier in the deposition process, with an $SiO_2$ soot layer being applied by an OVD method onto the jacket surface of the tube. The quartz glass tube, including the soot layer, is then introduced into a vitrification furnace and held therein in vertical orientation by means of the vitrification linkage, as is also described in the above-mentioned EP 701 975 A1. The quartz glass, including the soot layer, is here collapsed onto a holding rod of graphite which extends through the inner bore of the quartz glass tube. This yields a quartz glass cylinder with a comparatively precise inner bore and also minimizes the introduction of impurities originating from the graphite of the holding rod into the porous soot layer. As for the necessary reworking operations, however, the same drawbacks as in the above-described procedure must be faced.

Methods are also known in which an $SiO_2$ soot layer is simultaneously sintered and collapsed onto a core rod. For instance, U.S. Pat. No. 6,422,042 A discloses a method for producing a preform for optical fibers, wherein an $SiO_2$ soot layer is applied to the jacket surface of a tube of fluorine-doped quartz glass. A core rod is introduced into the inner bore of the quartz glass tube and the soot layer is subsequently vitrified in a hot process and the quartz glass tube is simultaneously collapsed onto the core rod.

A drawback of this method is that the precious core rod will also be lost in case of failure of the collapsing and vitrifying process.

Finally DE 101 55 134 C discloses a method for producing an optical preform in which a porous $SiO_2$ soot layer is directly deposited onto the outer surface of a core rod rotating about its longitudinal axis. To avoid incorporation of hydroxyl groups into the quartz glass of the core rod, the $SiO_2$ soot layer is deposited into a hydrogen-free reaction zone, for instance a hydrogen-free plasma.

An advantage of this method is that a mechanical treatment of an inner surface is not required and that high costs and material losses can therefore be avoided. However, also in this procedure, precious core rod will get lost in case of failure of the build-up process.

OBJECT OF THE INVENTION

A method would therefore be desirable, wherein on the one hand the production process (particularly the sintering process) of the hollow cylinder of quartz glass is completed before said cylinder is further processed together with the core rod, and wherein on the other hand a complicated machining of the inner bore of the hollow cylinder of quartz glass is not required.

The provision of such a method is one aspect of the technical object underlying the present invention.

Moreover, the invention shall provide a hollow cylinder of quartz glass that is as thick-walled as possible and is characterized by a low-damage inner bore.

Furthermore, it is the object of the present invention to indicate a simple and inexpensive method for producing a preform for an optical fiber and to indicate a fiber and to provide an inexpensive preform that is obtained according to this method.

As for the method for producing the hollow cylinder, this object starting from a method of the above-mentioned type is achieved according to the invention in that during sintering the surface temperature of the inner wall of the inner tube is kept below the softening temperature.

In the method according to the invention, the jacket surface of an inner tube of quartz glass with a high-quality inner bore is thus clad with an $SiO_2$ soot layer and the layer is then sintered. In contrast to the generic method the sintering process, however, is not carried out such that the inner wall of the inner tube is softened and deformed, but on the contrary deformation is to be avoided as much as possible. Hence, a complicated mechanical reworking of the inner bore can be dispensed with, so that it is possible to obtain a quartz glass tube with a high cylinder ratio at low costs, with the quartz glass tube comprising an inner bore having a wall of high geometric precision and surface quality.

Moreover, the method makes it possible to complete the manufacturing process for the hollow cylinder of quartz glass before said cylinder is equipped with one or several core rods and is processed into a preform or a fiber. This reduces the risk of core-rod loss.

An essential prerequisite is that during sintering of the soot layer there is no significant softening of the inner wall of the inner tube and that therefore there is no deformation beyond an acceptable extent. This is not trivial, for the sintering of the $SiO_2$ soot layer requires a high temperature which without any appropriate counter-measures would be enough for softening the quartz glass of the inner tube. Measures are therefore needed that prevent the high sintering temperatures from having an impact on the inner wall of the inner tube in order to counter softening and deformation.

As is known, no exact softening temperature can be assigned to glasses, but rather a softening temperature range. For the purpose of defining a temperature value, reference is herewith made to the provision according to DIN ISO 7884 (1998), according to which the softening temperature is defined as that temperature in which the glass has a viscosity of $10^{7.6}$ dPa·s. As for the softening temperature of quartz glass, the literature specifies temperature values in the range of 1600° C. to 1730° C.

The viscosity that is actually achieved due to a predetermined hot treatment depends on purity as well as type and amount of a possible doping of the quartz glass and on the duration of the hot treatment. Depending on the heating period, a hot treatment is always accompanied by a plastic deformation of the glass body.

Therefore, even at a comparatively low temperature, some deformation may be observed in the area of the inner wall of the inner tube. It is essential within the meaning of this invention that the extent of deformation is acceptable with respect to the use of the quartz glass cylinder for accommodating a core rod, so that mechanical reworking can be dispensed with. With this background it is defined as an acceptable extent of the deformation of the inner wall that the maximum values of the diameters of the inner bores of inner tube and hollow cylinder of quartz glass do not differ from one another by more than +/−5%, preferably not more than +/−1% (based on the original inner diameter of the inner tube).

The $SiO_2$ soot layer overclads an inner tube or a coaxial arrangement of an inner tube and one or several further quartz glass tubes. It is directly applied to the jacket surface of the inner tube or, in the case of a coaxial arrangement of quartz glass tubes, on the jacket surface of a tube located further to the outside, as a layer, or it is present in the form of a prefabricated separate jacket or cladding tube of $SiO_2$ soot which surrounds the inner tube (or a quartz glass tube positioned further to the outside). The thickness of the $SiO_2$ soot layer has an impact on the volume-related production costs. In a first approximation the manufacturing costs are decreasing with the thickness of the soot layer.

In the case of a coaxial arrangement of quartz glass tubes, "inner tube" means the innermost tube. It is important within the meaning of the invention that an acceptable degree of deformation of the inner bore thereof is at best allowed during sintering.

Hence, the basic idea of the invention consists in sintering an arrangement made up of an inner tube with a high-quality inner bore and an $SiO_2$ soot tube surrounding the inner tube or an $SiO_2$ soot layer applied to the inner tube in such a manner that the geometry of the inner wall of the inner tube is substantially upheld.

The inner tube and the $SiO_2$ soot layer (which also stands for an $SiO_2$ soot tube here and in the following) are normally made up of the same quartz glass, but may exhibit different quartz glass qualities and may be provided with different dopants.

Furthermore, the method according to the invention has the advantage that the minimally achievable inner diameter of the hollow cylinder does not depend (as in the current method) on the mechanical strength of a vitrification linkage, but, because of the fact that the self-supporting properties of the inner tube are upheld, it only depends on the original inner diameter of said tube. Therefore, depending on the original inner diameter of the inner tube, the manufacture of a hollow cylinder of quartz glass with a comparatively narrow inner bore is also made possible.

Since a deformation of the inner wall is avoided as much as possible, the method according to the invention also facilitates the manufacture of hollow cylinders with a non-circular radial cross-section, such as a hollow cylinder with an inner bore with polygonal (particularly rectangular or hexagonal) or ellipsoidal cross-section, or of hollow cylinders with several inner bores.

In practice, it has turned out tote useful when during sintering the surface temperature on the inner wall of the inner tube is limited to less than 1400° C., preferably to less than 1250° C.

The specific viscosity curve of a glass in dependence on the temperature is often characterized by those temperatures that are needed for setting the viscosities of $10^{7.6}$ dPa·s (softening temperature), $10^{13}$ dPa·s (upper cooling temperature) and $10^{14.5}$ dPa·s (lower cooling temperature) (determination according to DIN ISO 7884 (1998)). The literature lists the following temperature ranges for the softening temperature and for the upper and lower cooling temperature of quartz glass: 1600° C. to 1730° C., 1120° C. to 1180° C., 1025° C. to 1075° C.

With a limitation of the surface temperature to less than 1400° C., preferably less than 1250° C., the relaxation times of the quartz glass are however not so long that with the short sintering processes that are standard in industry there is no significant and at least a negligible deformation of the inner wall of the inner tube. This is also due to the fact that the duration of the hot treatment for sintering the $SiO_2$ soot layer is normally kept as short as possible and sintering is often carried out zone by zone, the two factors resulting—even at high sintering temperatures—in a surface temperature that tends to be low on the inner wall of the inner tube, thereby possibly promoting the stability of the inner wall.

On the other hand, a variant of the method is preferred in which during sintering the surface temperature on the inner wall is set to be above the lower cooling temperature of the specific quartz glass of the inner tube.

It is desired that with a maximum temperature action during sintering the inner wall also reaches a temperature that is above the lower cooling temperature of the specific quartz glass. At this temperature the quartz glass can still relax to some degree, which reduces the formation of mechanical stresses during cooling. The lower cooling temperature depends on the purity of the quartz glass and possible dopants and is in the case of pure quartz glass in the range of 1025° C. to about 1070° C.

Appropriate measures that counteract softening and deformation of the inner wall during sintering are those that contribute to a great temperature difference between the $SiO_2$ soot layer to be sintered and the inner wall of the inner tube. The following examples should be given:

provision of a heat barrier between the $SiO_2$ soot layer and the inner wall;

large wall thickness of the inner tube or a large total wall thickness of a corresponding coaxial arrangement of tubes (for instance more than 20 mm), a process control which leads to a steep temperature gradient between $SiO_2$ soot layer and inner wall, for instance a particularly high, but in return only short, heating of the $SiO_2$ soot layer, or other measures that reduce the action of the high sintering temperature on the inner wall. Particularly preferred is however a procedure in which the inner wall is subjected to forced cooling of the inner wall.

Cooling of the inner wall of the inner tube can be implemented particularly easily and permits, in addition, exact compliance with a predetermined maximum temperature and the adjustment of a particularly steep temperature gradient between the sintering $SiO_2$ soot layer and the inner wall. Independently of the wall thickness of the inner tube, the temperature gradient permits a sintering of the soot layer at a high temperature, without any significant softening and deformation taking place on the inner wall.

In this connection it has turned out to be particularly advantageous when forced cooling encompasses passing a cooling fluid through the inner bore.

The flowing cooling fluid effects forced cooling which independently of the wall thickness of the inner tube ensures an adequately low temperature on the inner wall. Therefore, a particularly thin-walled inner tube can also be used, which may be advantageous in terms of costs.

A hydrogen-free inert gas is preferably used as the cooling fluid.

In comparison with a liquid, a gaseous cooling fluid has the advantage that high-purity gas is available at low costs, and that the inner wall of the inner tube is hardly contaminated. The cooling gas is free from hydrogen, so that an incorporation of hydroxyl groups is avoided and the quartz glass cylinder to be manufactured comprises a low hydroxyl group content. Noble gases and nitrogen are here regarded as an inert gas.

The cooling fluid is preferably conducted in a closed cooling circuit so as to minimize the consumption of cooling fluid.

It has turned out to be particularly expedient when an inner tube with a wall thickness of less than 20 mm is used.

As has already been mentioned, the use of a particularly thin-walled inner tube offers an advantage in terms of costs because the remaining material of the hollow cylinder to be produced, which normally accounts for the greatest weight share in the total mass, can be provided at low costs by means of the soot layer without any mechanical reworking of the inner bore being needed. In practice, an inner tube having a wall thickness of less than 20 mm in the finished hollow cylinder of quartz glass leads to an inner layer having a thickness of less than 10% of the outer diameter of the hollow cylinder.

It has turned out to be useful when the soot layer is vitrified in a zone type sintering method.

The inner tube clad with the $SiO_2$ soot layer is here supplied, starting with one end, to a heating zone that is short in comparison with the length of the inner tube, and is successively heated therein. The $SiO_2$ soot layer is here sintered in portions. In a kinematic reversal, the heating zone can also be moved. Entrapped gases can escape in front of the sintering front, so that the formation of bubbles is prevented. Moreover, in comparison with an isothermal sintering process, this procedure normally leads to a higher temperature gradient between $SiO_2$ soot layer and inner wall, which facilitates the observance of an adequately low temperature on the inner wall.

In a particularly preferred variant of the method, it is intended that an inner tube should be used comprising an inner wall produced without any tools in the melt.

Such an inner tube is e.g. obtained by means of a drawing method by elongating a hollow cylinder of quartz glass. The resulting inner wall is smooth and free from microcracks. Since in the method according to the invention a fusion of the inner wall is intentionally prevented, a preset high quality of the inner wall is particularly expedient.

Furthermore, it has turned out to be advantageous when the hollow cylinder of quartz glass is subjected to an annealing process after vitrification.

Stresses are here reduced in the quartz glass. Preferably, the annealing process directly follows the vitrification process and can be carried out in the vitrification furnace, with an isothermal annealing process being here preferred.

Although in the method according to the invention the inner wall of the inner tube is not fused, contamination may nevertheless occur during vitrification, for instance due a cooling medium flowing past the wall. Therefore, a procedure is preferred in which the inner wall is cleaned after vitrification.

Cleaning can e.g. be carried out in a hydrofluoric acid solution. A layer is here removed from the inner wall, the thickness of the layer being for instance 30 μm. With an inner wall that is very smooth and without any microcracks, such an etching step does not lead to increased roughness.

If the hollow cylinder of quartz glass to be produced is to have a predetermined radial refractive index across its wall, the inner tube may be provided with a dopant that effects a reduction of the refractive index. This is e.g. fluorine or boron. The inner tube or the fiber layer obtained therefrom after fiber drawing thus helps to form a predetermined refractive index profile of the optical fiber.

Furthermore, it is advantageous when an inner tube is used in which the quartz glass has a hydroxyl group content of less than 1 wt ppm, preferably less than 0.1 wt ppm if a hollow cylinder of quartz glass is desired with a particularly low OH content.

Especially for the manufacture of particularly thick-walled quartz glass cylinders a variant of the method is preferred in which the hollow cylinder obtained according to method step (c) is provided as an inner tube for performing method steps (a) and (b).

Here, on an initial inner tube, additional cladding glass is produced by successively cladding the inner tube with a soot layer and by sintering the soot layer, the quartz glass tube obtained after sintering the soot layer being each time used as the inner tube. Since the sintering speed is clearly decreasing with the thickness of the soot layer, it is possible to produce with this variant of the method especially thick-walled hollow cylinders within acceptable process periods. Since the thickness of the wall of the inner tube is increasing with each sintering process, deformation can be avoided in subsequent sintering processes solely because of the thermal insulating effect of the existing wall. Additional measures, such as cooling the inner wall, can then be dispensed with.

Especially for the manufacture of cylindrical quartz glass products with a non-circular cross-section, a procedure has turned out to be useful in which an inner tube is provided with one or more inner bores of an oval or polygonal cross-section. As has already been explained further above, the method according to the invention facilitates the manufacture of hollow cylinders with a non-circular radial cross-section, for instance a hollow cylinder with one or more inner bores of polygonal (particularly rectangular or hexagonal) or ellipsoidal cross-section.

As for the hollow cylinder of synthetic quartz glass, the above-indicated object is achieved according to the invention by a hollow cylinder having an outer diameter in the range of 140 to 400 mm and an inner bore the inner diameter of which is less than 30% of the outer diameter, and which is defined by an inner wall produced without any tools in the melt, said inner wall being formed by an inner layer of a first synthetic quartz glass overclad by an $SiO_2$ outer layer of a second synthetic quartz glass.

The hollow cylinder according to the invention consists of at least two layers of identical or different synthetic quartz glass. The inner layer adjoining the inner bore is obtained from a vitreous inner tube, and it is directly or indirectly surrounded by an $SiO_2$ layer obtained by sintering an $SiO_2$ soot layer.

The hollow cylinder is characterized
  by an inner wall adjoining the inner bore of the hollow cylinder, which is produced in the melt and therefore exhibits a high surface quality and
  by a large cylinder ratio of outer diameter and inner diameter.

The smooth and narrow inner bore is produced by elongating a quartz glass cylinder that serves as a basis for making the inner layer. This method permits an inexpensive production of quartz glass tubes with narrow inner bore.

Hollow cylinders of quartz glass with a narrow inner bore are difficult to produce according to the OVD soot method, for on the one hand the mechanical stability under load and the thermal stability of the carrier body as well as the deposition efficiency turn out to be limiting factors, for the carrier body should have an outer diameter that is as small as possible so as to leave a small inner bore in the soot body. The smaller the outer diameter of the carrier body is at the beginning of the deposition process, the smaller is however the deposition efficiency in the OVD process. Moreover, the carrier body must have an adequate mechanical stability to carry the weight of a thick-walled and heavy soot tube. Therefore, a mechanically stable carrier body, i.e. one that is thick as a rule, is imperative for the manufacture of heavy soot bodies to prevent fracture or deflection and to achieve an adequate deposition efficiency.

The hollow cylinder according to the invention is preferably obtained by sintering an arrangement made up of inner tube and an $SiO_2$ soot layer cladding the inner tube, with the help of the method according to the invention.

Inner layer and $SiO_2$ outer layer normally consist of the same quartz glass, but may also have different quartz glass qualities and may be provided with different dopants.

The hollow cylinder of quartz glass can be produced at low costs and may have any desired cross-sectional profile.

With hollow cylinders having a non-circular radial cross-section, the diameter of the enveloping circle around the radial outer cross-sectional profile is regarded as the outer diameter, and the diameter of the maximum inner circle on the radial inner cross-sectional profile as the inner diameter of the inner bore.

The hollow cylinder of quartz glass can e.g. be used for making cladding tubes for lamps, capillaries or for use as a semifinished product in the making of optical fibers and preforms.

For the manufacture of a preform the inner bore is equipped with one or several core rods and is then elongated into a preform with a small inner diameter or into an optical fiber.

The inner diameter of the inner bore of the hollow cylinder is preferably less than 20% of the outer diameter.

This results in an inexpensive manufacture of a hollow cylinder with a particularly high cylinder ratio.

In this respect it is also advantageous when the inner layer has a thickness of less than 10% of the outer diameter.

Thus the outer layer that can be produced at particularly low costs accounts for the greatest part of the hollow cylinder volume.

Further advantageous developments of the hollow cylinder according to the invention become apparent from the subclaims. If developments outlined in the subclaims imitate the procedures indicated in subclaims for the method according to the invention, reference is made to the above observations on the corresponding method claims for supplementary explanation.

As for the method for producing an optical component, the above-mentioned technical object, starting from a method of the above-mentioned generic type, is achieved according to the invention in that during sintering of the $SiO_2$ soot layer the surface temperature of the inner wall of the inner tube is kept below the softening temperature.

The optical component obtained in this way is a preform for optical fibers or the optical fiber itself.

According to the invention a situation is prevented in the making of the preform where the quartz glass of the inner wall of the inner tube softens and the inner tube gets deformed beyond an acceptable extent. The method permits an inexpensive production of the optical fiber or of a preform for optical fibers from which the optical fiber is obtained by elongation.

Reference is made to the above explanations regarding the method of the present invention for producing the hollow cylinder. The advantageous variants of the method as explained there are also applicable to the method for making the component. To be more specific, during sintering of the soot layer the surface temperature on the inner wall of the inner tube is preferably limited to less than 1400° C., particularly preferably less than 1250° C., and the surface temperature on the inner wall is set during sintering of the hollow cylinder above the lower cooling temperature of the specific quartz glass of the inner tube.

Advantageous developments of the device according to the invention become apparent from the subclaims. Insofar as developments of the device indicated in the subclaims imitate the procedures indicated in subclaims with respect to the method according to the invention, reference is made to the above observations on the corresponding method claims for supplementary explanation. The developments of the device according to the invention as mentioned in the other subclaims shall be explained in the following.

As for the preform for an optical fiber, the above-indicated technical object is achieved according to the invention, starting from the above-mentioned method, in that at least part of the cladding glass region is formed by a hollow cylinder according to the invention.

Since at least part of the cladding glass region is formed by a hollow cylinder according to the invention, an inexpensive preform for optical fibers can be produced.

PREFERRED EMBODIMENTS

The invention shall now be explained in more detail with reference to embodiments and a drawing. In detail, the drawing is a schematic illustration showing in FIG. 1 a radial cross-section of a hollow cylinder of quartz glass according to the invention after sintering an $SiO_2$ soot layer;

FIG. 2 the hollow cylinder of FIG. 1 prior to sintering of the $SiO_2$ layer.

In FIG. 1 reference numeral 1 is assigned to a hollow cylinder on the whole. The hollow cylinder 1 comprises an inner bore 2 with an inner diameter "D" of 50 mm, the inner bore being surrounded by an inner layer 3 of synthetic quartz glass having a layer thickness "d" of 5 mm. Said layer is surrounded by a cladding glass layer 4 of synthetic quartz glass with a layer thickness of 40 mm, which accounts for the largest volume fraction of the hollow cylinder 1. The outer diameter of the hollow cylinder 1 is thus 140 mm.

The cladding glass layer 4 is produced by sintering an $SiO_2$ soot layer 4' (see FIG. 2), which has been deposited on an inner tube 3' of quartz glass according to the known OVD method. The inner tube 3' has an inner bore 2 with the inner diameter "D" of 50 mm and a wall thickness "d" of 5 mm. Thus, these dimensions "d" and "D" correspond to those of the inner layer of the quartz glass cylinder 1 of FIG. 1. The soot layer 4' has a thickness of about 95 mm.

The method according to the invention shall now be explained by way of example for making the hollow cylinder of quartz glass as shown in FIG. 1.

EXAMPLE 1

A hollow cylinder of synthetic quartz glass which is commercially available under the name "F 300" and can be bought from the company Heraeus Tenevo GmbH is elongated in a vertical drawing process without any tools and an inner tube 3' is obtained therefrom with an outer diameter of 60 mm, an inner diameter of 50 mm and a wall thickness of 5 mm. The quartz glass of the inner tube has a typical hydroxyl group content of less than 0.2 wt ppm and a chlorine content of less than 2500 wt ppm.

An $SiO_2$ soot layer 4' is produced on the inner tube 3' of quartz glass by an OVD process. $SiO_2$ particles are formed by flame hydrolysis of $SiCl_4$ and are deposited layer by layer on the outer jacket of the inner tube 3' rotating about its longitudinal axis, so that a porous $SiO_2$ soot layer 4' is formed with a layer thickness of about 95 mm on the inner tube 3'.

For reducing the hydroxyl group content of the soot layer 4' to a value of less than 0.5 wt ppm the coated inner tube 3' is dehydrated in a dehydration method in chlorine-containing atmosphere at 900° C.

Subsequently, the porous $SiO_2$ soot layer 4' is sintered with formation of the cladding glass layer 4 with the help of a vertical zone-type sintering method. The composite body 1' made up of inner tube 3' and soot layer 4' is here supplied, starting with the lower end, continuously to an annular short heating zone and the soot layer 4' is here vitrified zone by zone from the bottom to the top. The temperature in the heating zone is about 1800° C.

Nitrogen of purity 6.0 is here introduced through the inner bore 2 of the inner tube 3'. The amount of the nitrogen stream is here set such that on the inner wall 7 of the inner tube 3', and due to the cooling nitrogen flowing along the wall, a maximum temperature of 1100° C. is maintained on the inner wall 7, as shown by test measurements by means of a thermocouple.

The layer thickness of the soot layer 4' is reduced by sintering to about 40 mm, resulting in a hollow cylinder of quartz glass with an outer diameter of about 140 mm. The mean hydroxyl group content of the cladding glass layer 4 (averaged across the layer thickness) is about 0.5 wt ppm. The inner diameter and the wall thickness of the inner layer 4 of the resulting hollow cylinder 1 of quartz glass are here almost exactly identical with the corresponding dimensions of the original inner tube 4'.

After vitrification the hollow cylinder 1 of quartz glass is cleaned and the inner wall is acidified in hydrofluoric acid, a layer of about 30 μm being etched off from the inner wall 7.

The hollow cylinder 1 of quartz glass is then provided in a known rod-in-tube method with core rods and elongated into a preform. At both sides of the cladding glass layer 4 the ends of the original inner tube 3' are still projecting to some extent. The lower end of the original inner tube 3 is used for drawing purposes and for supporting the core rod, and the upper end as a holding pipe.

EXAMPLE 2

A hollow cylinder of synthetic quartz glass which is commercially available under the name "F 500" and can be bought from the company Heraeus Tenevo GmbH is elongated in a vertical drawing process without any tools and an inner tube 3' is obtained therefrom with an outer diameter of 60 mm, an inner diameter of 50 mm and a wall thickness of 5 mm. Quartz glass of such quality typically has a hydroxyl group content of less than 0.02 wt ppm and a chlorine content of less than 2500 wt ppm. A soot tube is produced in a separate manufacturing process in that an $SiO_2$ soot layer is deposited on a carrier rod of aluminum oxide by means of a standard OVD flame hydrolysis and deposition method, and the carrier tube is subsequently removed. This yields a soot tube with an inner diameter of 65 mm and a wall thickness of 160 mm. The tube is subjected to a dehydration treatment, as described above.

The resulting soot tube is arranged around the inner tube of quartz glass with formation of a coaxial arrangement and is vitrified together with the tube by way of a vertical zone-type sintering method. For mounting the soot tube an additional mount is used on which the soot tube can be supported at the beginning of the zone type sintering process. The zone type sintering process is here carried out in that the coaxial arrangement is supplied, starting with the upper end, from above to an annular short heating zone and is vitrified therein from the top to the bottom. The temperature in the heating zone is about 1800° C. The soot tube is sintered and simultaneously collapses onto the inner tube in this process.

During zone type sintering, nitrogen of purity 6.0 is introduced through the inner bore of the inner tube. The amount of the nitrogen stream is here set on the basis of a control operation such that on the inner wall of the inner tube 3', and due to the cooling nitrogen flowing along the wall, a maximum temperature of 1150° C. is maintained, as has been shown by thermocouple measurements previously taken way of tests.

During sintering the wall thickness of the soot tube is halved by about half the size, whereas the inner bore of the inner tube remains stable due to inert gas cooling and changes little. This yields a hollow cylinder of quartz glass with a high-precision smooth inner bore having an inner diameter of about 30 mm and an outer diameter of about 206 mm.

The composite body obtained after vitrification is provided with a core rod and directly elongated into a fiber.

EXAMPLE 3

A hollow cylinder of synthetic quartz glass is elongated in a vertical drawing process without any tools and an inner tube is obtained therefrom with an outer diameter of 126 mm, an inner diameter of 96 mm and a wall thickness of 15 mm. The quartz glass of the inner tube has a typical hydroxyl group content of less than 0.02 wt ppm and a chlorine content of less than 2500 wt ppm.

A first $SiO_2$ soot layer is produced on the inner tube of quartz glass by an OVD process with a thickness of 155 mm by flame hydrolysis of $SiCl_4$, it is dehydrated and sintered with the help of a vertical zone type sintering process, as described above with reference to Example 1. During sintering nitrogen of purity 6.0 is introduced through the inner bore of the inner tube in an amount which is enough to maintain a maximum temperature of 1100° C. on the inner wall of the inner tube.

The layer thickness of the soot layer is decreasing during sintering, whereas the inner diameter of the inner bore of the inner tube changes little due to inert gas cooling. This yields a tubular intermediate product with an outer diameter of 253 mm and an inner diameter of 96 mm, the intermediate product being present as a composite tube of quartz glass consisting of a melt composite made up of an inner layer and an outer layer of synthetic quartz glass, the outer layer consisting of quartz glass having a hydroxyl group content of less than 0.5 wt ppm.

The intermediate product can be elongated in a standard elongation process into a quartz glass tube having a predetermined cross-sectional profile, particularly also into a quartz glass tube having the original dimensions of the inner tube, i.e. with an outer diameter of 126 mm and an inner diameter of 96 mm. This yields a high-precision inner bore produced in the melt, which does not require any mechanical reworking and thus represents an inexpensive start product as an inner tube of quartz glass for use in the method of the invention.

In the present embodiment, however, the tubular intermediate product is directly used within the meaning of an "inner tube" as the start product for further deposition of a soot layer in that on the tubular intermediate product, by way of an OVD process, a second $SiO_2$ soot layer with a thickness of 214 mm is produced by flame hydrolysis of $SiCl_4$ and sintered without previous dehydration in a chlorine-containing atmosphere with the help of a vertical zone-type sintering process as described above with reference to Example 1.

During zone type sintering the composite tube of quartz glass is fixed between two holding cones of graphite attached at the front side. It has turned out that this support measure and the great wall thickness counteract a deformation of the composite tube of quartz glass so that cooling of the inner bore can be omitted, or that at least the nitrogen amount required for cooling is smaller than during sintering of the first $SiO_2$ soot layer.

This yields a particularly thick-walled hollow cylinder of quartz glass with a cylinder ratio of about 4 and with an outer diameter of 380 mm and an inner diameter of 96 mm, the mean hydroxyl group content in the last produced quartz glass layer being about 150 wt ppm.

The deposition of the $SiO_2$ soot layer in two method steps separated by a sintering process reduces the sintering period on the whole and particularly also the individual sintering steps. This facilitates the maintenance of a sufficiently low temperature on the inner wall of the inner tube. This is also promoted by the thicker inner wall of the quartz glass tube after the first sintering step.

After vitrification the hollow cylinder of quartz glass is cleaned and the inner wall is acidified in hydrofluoric acid, a layer of about 30 µm being etched off from the inner wall.

The hollow cylinder of quartz glass is then provided in a known rod-in-tube method with core rods and this coaxial arrangement is immediately elongated into an optical fiber. The ends of the original inner tube still projecting at both front sides are used for drawing purposes and for supporting the core rod and as holding pipes.

EXAMPLE 4

A hollow cylinder of synthetic quartz glass is elongated in a vertical drawing process without any tools and an inner tube is here obtained with an outer diameter of 60 mm and an inner diameter of 10 mm (the wall thickness is thus 25 mm; alternative inner diameters are for example 5 mm or 20 mm).

An $SiO_2$ soot layer is produced on the inner tube of quartz glass by an OVD process at a thickness of 156 mm by flame hydrolysis of $SiCl_4$, it is dehydrated and sintered by way of a vertical zone-type sintering method, as described above with reference to Example 1. During sintering nitrogen of purity 6.0 is introduced through the inner bore of the inner tube in an amount sufficient to maintain a maximum temperature of 1100° C. on the inner wall of the inner tube.

The sintering process reduces the layer thickness of the soot layer to about 70 mm, whereas the inner diameter of the inner bore of the inner tube changes little because of inert gas cooling. This yields a hollow cylinder of quartz glass with an outer diameter of 200 mm and an inner diameter of 10 mm and thus with a cylinder ratio of about 20 (with the above-mentioned alternative inner diameters, the cylinder ratios are 10 and 40, respectively, at the same outer diameter of the hollow cylinder).

After vitrification the hollow cylinder of quartz glass is cleaned and the inner wall is here acidified in hydrofluoric acid, a layer of about 30 µm being etched off from the inner wall.

The hollow cylinder of quartz glass is then drawn at a constant cylinder ratio into a capillary having an outer diameter of 2.5 mm and an inner diameter of 0.125 mm.

EXAMPLE 5

A hollow cylinder of quartz glass is shrunk onto a graphite mandrel with a hexagonal cross-section. This yields a hollow cylinder which has an inner bore with an exactly hexagonal cross-section and a cylinder jacket surface with an approximately hexagonal cross-sectional profile.

The hollow cylinder is elongated in a vertical drawing process without any tools, resulting in a hexagonal inner tube with an outer width across flats of 70 mm, an inner width across flats of 60 mm and a wall thickness of 5 mm.

An SiO₂ soot layer is produced on the inner tube by an OVD process and is sintered with the help of a vertical zone-type sintering process as described above with reference to Example 1. During sintering nitrogen of purity 6.0 is introduced through the inner bore of the inner tube at an amount sufficient to maintain a maximum temperature of 1100° C. on the inner wall of the inner tube.

During sintering of the soot layer, shape, dimension and quality of the inner bore of the inner tube are maintained. The soot layer is sintered into a quartz glass layer having a mean thickness of about 42 mm. The outer jacket of the cylinder has an approximately circular cross-section with an outer diameter of about 154 mm and is given an exactly circular outer diameter of 150 mm in a standard cylinder round-grinding method (peripheral grinding to obtain a hexagonal outer shape may e.g. also be required, depending on the intended use of the hollow cylinder).

The hollow cylinder of quartz glass produced in this way is then elongated into a quartz glass tube with an outer diameter of 50 mm and a hexagonal inner bore with a width across flats of 20 mm while maintaining the inner and outer profile.

The quartz glass tube with hexagonal inner tube is suited as a jacket tube for making so-called "PCFs" (photonic crystal fibers, also called "holey fibers", optical hollow fibers).

The invention claimed is:

1. A method for producing a hollow cylinder of synthetic quartz glass, said method comprising:
    a) providing an inner tube of synthetic quartz glass having an inner bore defined by an inner wall;
    b) cladding the inner tube with an SiO₂ soot layer;
    c) sintering the SiO₂ soot layer so as to form the hollow cylinder;
wherein, during sintering, the inner wall of the inner tube has a surface temperature that is kept below a softening temperature; and
wherein during sintering, the surface temperature of the inner wall of the inner tube is less than 1400° C.

2. The method according to claim 1, wherein the quartz glass of the inner tube has a lower cooling temperature, and, during sintering, the surface temperature of the inner wall is greater than the lower cooling temperature of the quartz glass of the inner tube.

3. A method for producing a hollow cylinder of synthetic quartz glass, said method comprising:
    d) providing an inner tube of synthetic quartz glass having an inner bore defined by an inner wall;
    e) cladding the inner tube with an SiO₂ soot layer;
    f) sintering the SiO₂ soot layer so as to form the hollow cylinder;
wherein, during sintering, the inner wall of the inner tube has a surface temperature that is kept below a softening temperature; and
wherein the inner wall is subjected to forced cooling.

4. The method according to claim 3, wherein the forced cooling comprises passing a cooling fluid or gas through the inner bore.

5. The method according to claim 4, wherein the cooling fluid or gas is a hydrogen-free inert gas.

6. The method according to claim 3, wherein a cooling fluid or gas is conducted in a closed cooling circuit in the forced cooling.

7. The method according to claim 1, wherein the inner tube has a wall thickness of less than 20 mm.

8. The method according to claim 1, wherein the soot layer is vitrified in a zone type sintering method.

9. The method according to claim 1, wherein the inner wall is produced without use of any tools in a melt.

10. The method according to claim 1, wherein, after sintering, the hollow cylinder of quartz glass is subjected to an annealing process.

11. The method according to claim 1, wherein an inner wall of the hollow cylinder of quartz glass is cleaned after vitrification.

12. A method for producing a hollow cylinder of synthetic quartz glass, said method comprising:
    g) providing an inner tube of synthetic quartz glass having an inner bore defined by an inner wall;
    h) cladding the inner tube with an SiO₂ soot layer;
    i) sintering the SiO₂ soot layer so as to form the hollow cylinder;
wherein, during sintering, the inner wall of the inner tube has a surface temperature that is kept below a softening temperature; and
wherein the quartz glass of the inner tube contains a dopant effecting a reduction of the refractive index.

13. The method according to claim 1, wherein the inner tube of quartz glass has a hydroxyl group content of less than 1 wt ppm.

14. The method according to claim 1, and further comprising
providing the hollow cylinder obtained according to said method step (c) as the inner tube in performing a subsequent iteration of method steps (a) and (b).

15. A method for producing a hollow cylinder of synthetic quartz glass, said method comprising:
    j) providing an inner tube of synthetic quartz glass having an inner bore defined by an inner wall;
    k) cladding the inner tube with an SiO₂ soot layer;
    l) sintering the SiO₂ soot layer so as to form the hollow cylinder;
wherein, during sintering, the inner wall of the inner tube has a surface temperature that is kept below a softening temperature; and
wherein the inner tube has one or more inner bores of an oval or polygonal cross section.

16. A method for producing an optical component, said method comprising:
    producing a hollow cylinder of synthetic quartz glass including
    providing an inner tube of synthetic quartz glass having an inner wall defining an inner bore;
    cladding the inner tube with an SiO₂ and
    sintering the SiO₂ soot layer so as to form the hollow cylinder;
    fixing a core rod in the inner bore of the hollow cylinder so as to form a coaxial arrangement; and
    elongating the coaxial arrangement into the optical component, wherein, during the sintering of SiO₂ soot layer, the inner wall of the inner tube has a surface temperature that is kept below a softening temperature; and
    wherein during sintering, the surface temperature of the inner wall of the inner tube is less than 1400° C.

17. The method according to claim 16, wherein the quartz glass of the inner tube has a lower cooling temperature, and during sintering, the surface temperature of the inner wall is greater than the lower cooling temperature of the quartz glass of the inner tube.

18. The method according to claim 1, wherein during sintering, the surface temperature of the inner wall of the inner tube is less than 1250° C.

19. The method according to claim 1, wherein the inner tube of quartz glass has a hydroxyl group content of less than 0.1 wt ppm.

20. The method according to claim 16, wherein during sintering, the surface temperature of the inner wall of the inner tube is less than 1250° C.

* * * * *